United States Patent
Wakita et al.

(10) Patent No.: US 8,609,742 B2
(45) Date of Patent: Dec. 17, 2013

(54) HIGH ENERGY RAY-CURABLE COMPOSITION

(75) Inventors: Mari Wakita, Chiba (JP); Motoshi Sasaki, Chiba (JP); Peter Cheshire Hupfield, South Glamorgan (GB); Yasuo Itami, Osaka (JP); Kaori Ozawa, Osaka (JP); Masahiko Maeda, Osaka (JP)

(73) Assignees: Daikin Industries, Ltd., Osaka (JP); Dow Corning Corporation, Midland, MI (US)

( * ) Notice: Subject to any disclaimer, the term of this patent is extended or adjusted under 35 U.S.C. 154(b) by 777 days.

(21) Appl. No.: 12/281,158

(22) PCT Filed: Feb. 28, 2007

(86) PCT No.: PCT/JP2007/053772
§ 371 (c)(1),
(2), (4) Date: Feb. 23, 2009

(87) PCT Pub. No.: WO2007/102370
PCT Pub. Date: Sep. 13, 2007

(65) Prior Publication Data
US 2011/0135905 A1 Jun. 9, 2011

(30) Foreign Application Priority Data

Mar. 2, 2006 (JP) ................. P2006-056508

(51) Int. Cl.
| | | |
|---|---|---|
| C08F 2/50 | (2006.01) | |
| C08G 18/67 | (2006.01) | |
| C03C 17/28 | (2006.01) | |
| C03C 17/30 | (2006.01) | |
| C03C 17/32 | (2006.01) | |

(52) U.S. Cl.
USPC .................. 522/97; 522/74; 522/77; 522/83; 522/84; 522/90; 522/96; 522/113; 522/114; 522/120; 522/121; 522/148; 522/150; 522/151; 522/152; 522/153; 522/154; 522/155

(58) Field of Classification Search
USPC ............... 522/71, 74, 77, 83, 84, 90, 97, 113, 522/114, 120, 150, 151, 152, 153, 154, 155
See application file for complete search history.

(56) References Cited

U.S. PATENT DOCUMENTS

| | | | | |
|---|---|---|---|---|
| 4,348,462 | A | * | 9/1982 | Chung ............... 428/412 |
| 5,409,965 | A | * | 4/1995 | Hosokawa et al. ....... 522/83 |
| 6,906,115 | B2 | * | 6/2005 | Hanazawa et al. ....... 522/97 |
| 7,623,874 | B2 | * | 11/2009 | Duan ............... 455/456.1 |
| 7,632,874 | B2 | * | 12/2009 | Hayashida et al. ....... 522/82 |
| 2004/0181008 | A1 | | 9/2004 | Hanazawa et al. |
| 2007/0148596 | A1 | * | 6/2007 | Hayashida et al. ..... 430/270.13 |

FOREIGN PATENT DOCUMENTS

| | | |
|---|---|---|
| EP | 1059319 A2 | 12/2000 |
| EP | 1 411 073 A1 | 4/2004 |
| GP | GB 2 089 826 A | 6/1982 |
| JP | 57500984 | 6/1982 |
| JP | 2001019736 A | 1/2001 |
| JP | 2004225019 A1 | 8/2004 |
| JP | 2004269589 A | 9/2004 |
| WO | WO8200295 | 2/1982 |
| WO | WO 97/12942 | 4/1997 |
| WO | WO 00/50517 | 8/2000 |
| WO | WO03002628 A1 | 1/2003 |
| WO | WO2004078863 A1 | 9/2004 |
| WO | WO 2005/049687 A1 | 6/2005 |

OTHER PUBLICATIONS

Corporate News Report from Daikin. (Apr. 25, 2007) Daikin Introduces New Fluorine Antifouling Additive for UV Cure Coatings "OPTOOL DAC" Delivering Excellent Easy-Clean Property for Dirt and Fingerprints on Display Panel. [online]. Retrieved online on [Mar. 7, 2012]. Retrieved from Internet<URL: http://www.daikin.com/press/2007/070425/index.html>.*
International Search Report, International Application No. PCT/JP2007/053772 dated May 29, 2007.
European Search Report, Application No. 07715058.9-2109/1995260 PCT/JP200705372 dated Apr. 27, 2010.

* cited by examiner

Primary Examiner — Sanza McClendon
(74) Attorney, Agent, or Firm — Dinsmore & Shohl LLP

(57) ABSTRACT

Disclosed is a high energy ray-curable composition which is excellent in storage stability before curing and enables to form a cured coating film which is excellent in hardness, property of preventing adhesion of fats and oils, property of wiping off fats and oils, abrasion resistance, transparency, water repellency, adhesion, smoothness and uniformity. Specifically disclosed is a high energy ray-curable composition containing the following components (A)-(D). (A) 100 parts by weight of a polyfunctional acrylate (B) 1-30 parts by weight of an organoalkoxysilane having an aliphatic unsaturated bond (C) 1-100 parts by weight of colloidal silica (D) 0.2-20 parts by weight of a fluorine compound having an aliphatic unsaturated bond.

14 Claims, No Drawings

HIGH ENERGY RAY-CURABLE COMPOSITION

TECHNICAL FIELD

The present invention relates to a high energy ray-curable composition, and more particularly to a high energy ray-curable composition which has excellent storage stability before curing, and enables formation of a cured coating film which has excellent hardness, prevents adhesion of oil and fat stains, allows oil and fat stains to be wiped off, and is excellent in scratch resistance, transparency, water repellency, adhesion, smoothness and uniformity.

BACKGROUND ART

High energy ray-curable coating agents capable of being cured by irradiation with high energy rays such as radiation, ultraviolet rays, electron beam and γ rays are known and, for example include an abrasion-resistant ultraviolet-curable coating composition comprising a non-silyl acrylate, colloidal silica, an acryloxy functional silane and a photopolymerization initiator (Published Japanese Translation No. 57-500984 of the PCT Application (JP-T2-57-500984)) is known. A high energy ray-curable composition having improved physical strength, comprising a polyfunctional acrylate, colloidal silica, an organoalkoxysilane and an amino-modified organopolysiloxane or a Michael addition reaction product thereof (Japanese Unexamined Patent Publication (Kokai) No. 2004-269589 (JP-A-2004-269589)) is also known. However, this composition had the problem that a cured coating film formed therefrom did not sufficiently repel oils or prevent adhesion of finger prints.

Japanese Unexamined Patent Publication (Kokai) No. 2001-19736 (JP-A-2001-19736) describes a specific fluorinated oligourethane comprising a polyisocyanate, a specific heterofunctional hydrogenated monomer, a difunctional hydroxyl perfluoropolyether and a monofunctional hydroxyl (per)fluoropolyether. This publication also describes that a protective film having water- and oil-repellency and stain resistance can be formed by treating a surface of a building material with an aqueous dispersion of the fluorinated oligourethane. However, such a protective film was not suited for use in applications requiring hardness.

WO03/002628 describes that a specific composition having a carbon-carbon double bond and a perfluoropolyether group is useful as a surface treatment agent, and also describes an acryl coating agent containing the composition. Such a coating agent has an advantage that the resultant coating film is excellent in water- and oil-repellency and has uniform appearance, and is also excellent in smoothness and uniformity. However, the coating agent was not suited for use in applications requiring physical strength.

Document 1: JP-T2-57-500984
Document 2: JP-A-2004-269589
Document 3: JP-A-2001-19736
Document 4: WO03/002628

DISCLOSURE OF THE INVENTION

The present invention has been made so as to solve the above problems and an object thereof is to provide a high energy ray-curable composition which has excellent storage stability before curing, and enables formation of a cured coating film which has excellent hardness, prevents adhesion of oil and fat stains, allows oil and fat stains to be wiped off, and is excellent in scratch resistance, transparency, water repellency, tight adhesion, smoothness and uniformity.

The present inventors have intensively studied and found that the above object can be achieved by a high energy ray-curable composition comprising the following components (A) to (D):
(A) 100 parts by weight of a polyfunctional acrylate,
(B) 1 to 30 parts by weight of an organoalkoxysilane having an aliphatic unsaturated bond,
(C) 1 to 100 parts by weight of colloidal silica, and
(D) 0.2 to 20 parts by weight of a fluorine compound having an aliphatic unsaturated bond. Thus the present invention has been completed.

The present inventors have also found that a fluorine compound having a perfluoropolyether structure is preferably used as the component (D) and that the perfluoropolyether structure is particularly preferably a partial structure represented by the general formula (a):

General Formula:

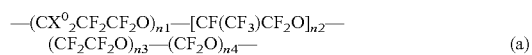

(a)

wherein n1, n2, n3 and n4 are the same or different and each is an integer of 0 or 1 or more, and n1+n2+n3+n4 is an integer of 7 to 40; and respective $X^0$ are the same or different and each is H, F or Cl. Thus, the present invention has been completed.

Furthermore, the present inventors have found that it is particularly preferred that the component (D) is a reactive group-containing composition comprising a reaction product of (i) a triisocyanate formed by trimerizing a diisocyanate and (ii) at least two active hydrogen-containing compounds, and the component (ii) comprises:
(ii-1) a perfluoropolyether having at least one active hydrogen, and
(ii-2) a monomer having an active hydrogen and a self-crosslinking functional group. Thus, the present invention has been completed.

That is, the present invention provides:
"[1] a high energy ray-curable composition comprising the following components (A) to (D):
(A) 100 parts by weight of a polyfunctional acrylate,
(B) 1 to 30 parts by weight of an organoalkoxysilane having an aliphatic unsaturated bond,
(C) 1 to 100 parts by weight of colloidal silica, and
(D) 0.2 to 20 parts by weight of a fluorine compound having an aliphatic unsaturated bond;
[2] the high energy ray-curable composition according to the above-described [1], wherein the fluorine compound has a perfluoropolyether structure;
[3] the high energy ray-curable composition according to the above-described [1], wherein the fluorine compound has a partial structure represented by the following general formula (a):

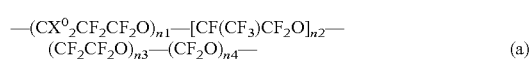

(a)

wherein n1, n2, n3 and n4 are the same or different and each is an integer of 0 or 1 or more, and n1+n2+n3+n4 is an integer of 7 to 40; and respective $X^0$ are the same or different and each is H, F or Cl;
[4] the high energy ray-curable composition according to the above-described [1], wherein the fluorine compound is a reactive group-containing composition comprising a reaction product of (i) a triisocyanate formed by trimerizing a diisocyanate and (ii) at least two active hydrogen-containing compounds, and the component (ii) comprises:
(ii-1) a perfluoropolyether having at least one active hydrogen, and
(ii-2) a monomer having an active hydrogen and a self-crosslinking functional group;
[5] the high energy ray-curable composition according to the above-described [4], wherein the self-crosslinking functional group of the monomer (ii-2) is at least one selected from the group consisting of:

[Chemical Formula 1]

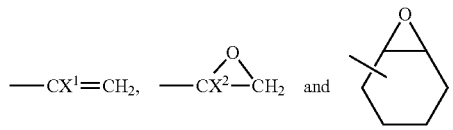

$X^1$ is H, $CH_3$ or F; and $X^2$ is H or $CH_3$;
[6] the high energy ray-curable composition according to the above-described [4] or [5], wherein the perfluoropolyether (ii-1) is a compound which has one hydroxyl group at one molecular end, or has one hydroxyl group at each of both ends;
[7] The high energy ray-curable composition according to the above-described [4] or [5], wherein the perfluoropolyether (ii-1) contains a compound represented by the general formula:

[Chemical Formula 2]

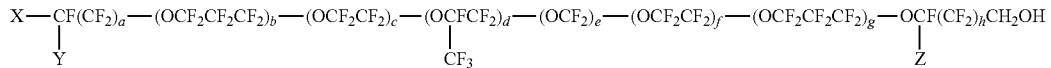

wherein X is F or a —$CH_2OH$ group; Y and Z are the same or different and each is F or —$CF_3$; a is an integer of 1 to 16, c is an integer of 0 to 5, b, d, e, f and g are the same or different and each is an integer of 0 to 200, and h is an integer of 0 to 16;
[8] the high energy ray-curable composition according to any one of the above-described [4] to [7], wherein the fluorine compound is a reaction product obtained by reacting an isocyanato group (—NCO group) of the triisocyanate component (i) with the component (ii-1) and then reacting with the component (ii-2);
[9] The high energy ray-curable composition according to any one of the above-described [4] to [7], wherein the fluorine compound is a reaction product obtained by reacting 1 mol of the triisocyanate component (i) with a sum total of the active hydrogen of the component (ii-1) and the component (ii-2) of from 2.5 to 3.5 mol in which a molar ratio of the active hydrogen of the component (ii-1) to the active hydrogen of the component (ii-2) is ½ or less;
[10] The high energy ray-curable composition according to any one of the above-described [1] to [10], which further contains 10 to 1000 parts by weight of (E) a solvent (in particular, organic solvent, for example alcohol);
[11] the high energy ray-curable composition according to any one of the above-described [1] to [10], which further contains (F) water;
[12] the high energy ray-curable composition according to any one of the above-described [1] to [11], wherein the component (A) is a polyfunctional acrylate containing a penta- or higher polyfunctional acrylate;

[13] the high energy ray-curable composition according to any one of the above-described [1] to [12], which further contains (G) a photopolymerization initiator;
[14] a coating agent comprising the high energy ray-curable composition according to any one of the above-described [1] to [13]; and
[15] A substrate selected from the group consisting of plastic, glass, ceramics, metal, concrete, wood, fiber cloth, fiber, nonwoven fabric, leather, paper and stone, comprising the high energy ray-curable composition according to any one of the above-described [1] to [13] on a surface thereof."

The present invention can provide a high energy ray-curable composition which has excellent storage stability before curing, and enables formation of a cured coating film which has excellent hardness, prevents adhesion of oil and fat stains, allows oil and fat stains to be wiped off, and is excellent in scratch resistance, transparency, water repellency, adhesion, smoothness and uniformity.

MODE FOR CARRYING OUT THE INVENTION

The high energy ray-curable composition of the present invention comprises the following component (A), component (B), component (C) and component (D):
(A) 100 parts by weight of a polyfunctional acrylate,
(B) 1 to 30 parts by weight of an organoalkoxysilane having an aliphatic unsaturated bond,
(C) 1 to 100 parts by weight of colloidal silica, and
(D) 0.2 to 20 parts by weight of a fluorine compound having an aliphatic unsaturated bond.

Each component will be described in detail below.
The component (A) is a polyfunctional acrylate and is a component which imparts high energy ray-curability to the composition. The polyfunctional acrylate may contain a fluorine atom and/or a silicon atom or not, but preferably contains neither a fluorine atom nor silicon atom. Such a polyfunctional acrylate is a difunctional or higher polyfunctional (for example, difunctional to icosafunctional) acrylate monomer or a difunctional or higher polyfunctional (for example, difunctional to icosafunctional) acrylate oligomer. In view of curability, a pentafunctional or higher polyfunctional (for example, pentafunctional to decafunctional) acrylate is preferably used. Specific examples thereof include difunctional acrylate monomers such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol)diacrylate, tetraethylene glycol dimethacrylate, 1,3-butylene glycol diacrylate, triethylene glycol diacrylate, triisopropylene glycol diacrylate, polyethylene glycol diacrylate and bisphenol A dimethacrylate; trifunctional acrylate monomers such as trimethylolpropane triacrylate, trimethylolpropane trimethacrylate, pentaerythritol monohydroxytriacrylate and trimethylolpropane triethoxytriacrylate; tetrafunctional acrylate monomers such as pentaerythritol tetraacrylate and ditrimethylolpropane tetraacrylate; penta- or higher polyfunctional monomers, such as dipentaerythritol hexaacrylate and dipentaerythritol (monohydroxy)pentaacrylate; bisphenol A epoxy diacrylate; hexafunctional aromatic urethane acrylate [EBECRYL™ 220], aliphatic urethane diacrylate [EBECRYL™ 230], and acrylate oligomer of tetrafunctional polyester acrylate [EBECRYL™ 80]. These polyfunctional acrylates may be used alone, or two or more of them may be used in combination. It is preferred to contain a penta- or higher poly-functional acrylate, and the content preferably accounts for 30% by weight or more (for example, 30% by weight to 100% by weight), more preferably 50% by weight or more, and still more preferably 80% by weight or more of the component (A).

The component (B) is an organoalkoxysilane having an aliphatic unsaturated bond and is a component which enables a surface treatment of colloidal silica as the component (C) to improve affinity with the component (A), thus imparting good storage stability to the composition of the present invention. It is also a component which imparts high energy ray-curability to the composition of the present invention since it enables crosslinking with the component (A) upon curing to improve the degree of crosslinking of a cured material. The component (B) may contain a fluorine atom or not, but usually contains no fluorine atom. Such a component (B) is preferably a compound represented by the general formula: $R^1{}_aYSi(OR^2)_{3-a}$. In the formula, $R^1$ is a substituted or unsubstituted monovalent hydrocarbon group (for example, 1 to 20 carbon atoms) which contains no aliphatic unsaturated bond, and examples thereof include alkyl groups such as a methyl group, an ethyl group, a propyl group, a butyl group, an isobutyl group, an octyl group and a decyl group; aryl groups such as a phenyl group; and fluoroalkyl groups such as a 3,3,3-trifluoromethyl group, a perfluorobutylethyl group and a perfluorooctylethyl group. Among these groups, a methyl group, an ethyl group, a propyl group, a butyl group and an isobutyl group are preferred. $R^2$ is an alkyl group and is preferably an alkyl group having 1 to 10 carbon atoms, and particularly preferably a methyl group, an ethyl group or a propyl group. Y is a monovalent organic group (for example, 1 to 10 carbon atoms) which has an aliphatic unsaturated bond, and examples thereof include acryl group-containing organic groups such as a methacryloxy group, an acryloxy group, a 3-(methacryloxy)propyl group and a 3-(acryloxy)propyl group; alkenyl groups such as a vinyl group, a hexenyl group and an allyl group; a styryl group and a vinylether group. a is 0 or 1.

Specific examples of the component (B) include 3-(methacryloxy)propyltrimethoxysilane, 3-(methacryloxy)propyltriethoxysilane, 3-(methacryloxy) propylmethyldimethoxysilane, 3-(acryloxy)propyltrimethoxysilane, vinyltrimethoxysilane, vinyltriethoxysilane, methylvinyldimethoxysilane and allyltriethoxysilane. In the composition of the present invention, the amount of the component (B) is from 1 to 30 parts by weight, and preferably from 5 to 20 parts by weight, based on 100 parts by weight of the component (A).

The component (C) is colloidal silica and is a component which enables an increase in hardness of the cured coating film of the composition of the present invention to improve scratch resistance. In the composition of the present invention, the amount of the component (C) is from 1 to 100 parts by weight, and preferably from 5 to 80 parts by weight, based on 100 parts by weight of the component (A). In the colloidal silica as the component (C), a surface of silica may be modified with a hydrolyzable silicon group or a silanol group as long as the object of the present invention is not adversely affected. There is an advantage that an unmodified colloidal silica can also be used since the effect of treating the surface of silica with the component (B) is exerted. Such an unmodified colloidal silica is available in the form of an acidic or basic dispersion. In the present invention, colloidal silica in any form can be used. When a basic colloidal silica is used, a dispersion is preferably made acidic by means such as addition of an organic acid so as to prevent gelation of the composition and to prevent precipitation of silica from the colloidal dispersion.

A dispersion medium for the component (C) is not particularly limited. In view of drying properties, the dispersion medium is preferably a solvent having comparatively low boiling point (for example, 30 to 200° C. under 1 atmosphere, particularly preferably 40 to 120° C.), that is, a conventional solvent for a coating material. Specific examples of the dispersion medium include water; alcohols (having, for example, 1 to 20 carbon atoms) such as methanol, ethanol, isopropanol, n-butanol, 2-methylpropanol, 4-hydroxy-4-methyl-2-pentanone, ethylene glycol and propylene glycol monomethyl ether (PGM); cellosolves (having, for example, 1 to 10 carbon atoms) such as methyl cellosolve, ethyl cellosolve and butyl cellosolve; dimethylacetamide, toluene, xylene, methyl acetate, ethyl acetate, butyl acetate and acetone. It is preferred to use, as the dispersion medium, water, alcohols, particularly propylene glycol monomethyl ether (PGM). Hereinafter, a blended dispersion of colloidal silica and a dispersion medium, in which the colloidal silica is dispersed, is referred to as a colloidal silica dispersion. An average particle diameter of the colloidal silica is suitably 200 nm or less, preferably from 1 to 100 nm, and particularly preferably from 1 to 50 nm, in view of dispersibility. When used as the colloidal silica dispersion, the content, that is, the concentration of the colloidal silica is optional and is preferably from 10 to 70% by weight in view of ease of handling.

The component (D) is a fluorine compound having an aliphatic unsaturated bond and has excellent compatibility with a polyfunctional acrylate as the component (A) composing the composition of the present invention. The resultant composition has uniform appearance and the resultant cured coating film formed by curing the composition has excellent uniformity and smoothness. The component (D) is a fluorine compound having an aliphatic unsaturated bond containing one or more carbon-carbon double bonds in the molecule and is also a component which is copolymerized with other monomers in the compositions under irradiation with high energy ray to impart curability to the composition of the present invention. The component (D) is a component which exerts an excellent surface modification effect of being strongly fixed in the cured coating film through the copolymerization reaction after curing to impart excellent properties of preventing adhesion of oil and fat stains, properties of wiping off oil and fat stains, water repellency and lubricity.

The component (D) may contain silicon atom or not.

It is preferred to use, as the component (D), a fluorine compound having a perfluoropolyether structure in view of a surface modification effect (particularly, water repellency and lubricity) of the composition of the present invention, and the perfluoropolyether structure is particularly preferably a partial structure represented by the general formula (a):

General Formula:

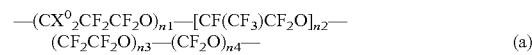
(a)

wherein n1, n2, n3 and n4 are the same or different and each is an integer of 0 or 1 or more, and n1+n2+n3+n4 is an integer of 7 to 40; and respective $X^0$ are the same or different and each is a group selected from a hydrogen atom (—H), a fluorine atom (—F) and a chlorine atom (—Cl) bonded to a carbon atom. In the general formula, it is not necessary that each unit is arranged in the order described, and each unit may be arranged in any order.

Furthermore, it is particularly preferred that the component (D) is a reactive group-containing composition comprising a reaction product of (i) a triisocyanate formed by trimerizing a diisocyanate and (ii) at least two active hydrogen-containing compounds, and the component (ii) comprises:
(ii-1) a perfluoropolyether having at least one active hydrogen, and
(ii-2) a monomer having an active hydrogen and a self-crosslinking functional group, in view of a surface modification effect (particularly, water repellency and lubricity) of the composition of the present invention)

The active hydrogen in the component (ii) is a hydrogen atom capable of reacting with an isocyanato group of the component (i). It is preferred that the active hydrogen is covalently bonded with oxygen (O), nitrogen (N), phosphorus (P) or sulfur (S) to form a reactive group and the component (ii) is a component having a reactive group containing active hydrogen. Examples of the reactive group containing active hydrogen include a hydroxyl group (—OH), an amino group (—NH$_2$), a mercapto group (—SH), an amide bond (—CONH—), an imino bond (—NH—) and a phosphorus-hydrogen bond (—PH—).

The component (ii) preferably has a group containing a reactive group.

Examples of the group containing a hydroxyl group include mono- to tetra-hydric alcohol groups having an organic group having 1 to 20 carbon atoms such as an aliphatic group or an aromatic group.

Examples of the group containing an amino group (—NH$_2$) include primary amine groups (—RNH$_2$ (R is, for example, an organic group having 1 to 20 carbon atoms such as an aliphatic group or an aromatic group)).

Examples of the group containing a mercapto group include mono- to tetra-hydric thiol groups having an organic group having 1 to 20 carbon atoms such as an aliphatic group or an aromatic group.

Examples of the group containing an imino bond (—NH—) include, in addition to a secondary amine group, imino bonds contained in nitrogen-containing 6-membered ring structures such as a piperazinyl group and a piperidinyl group (excluding a 1-piperidinyl group); nitrogen-containing five-membered ring structures such as a pyrrolidinyl group (excluding a 1-pyrrolidinyl group), a pyrrolyl group (excluding a 1-pyrrolyl group), a pyrrolinyl group (excluding a 1-pyrrolinyl group), an imidazolyl group (excluding a 1-imidazolyl group) and a pyrazolyl group (excluding a 1-pyrazolyl group); and nitrogen-containing condensed polycyclic structures such as an indolyl group (excluding a 1-indolyl group), an indazolyl group (excluding a 1-indazolyl group), a purinyl group (excluding a 7-purinyl group), a perimidinyl group (excluding a 1-perimidinyl group) and a carbazolyl group (excluding a 9-carbazolyl group).

Examples of the group containing a phosphorus-hydrogen bond (—PH—) include phosphorus-containing cyclic structures such as a phosphindolyl group (excluding a 1-phosphindolyl group).

In the present invention, the reactive group is preferably a hydroxyl group (—OH), an amino group (—NH$_2$), an mercapto group (—SH) or an imino bond (—NH—), and particularly preferably an alcoholic hydroxyl group (—OH), a phenolic hydroxyl group (—OH), a silanol group (Si—OH), a terminal amino group (—NH$_2$) forming a primary amine group, an imino bond (—NH—) forming a secondary amine group, or an imino bond (—NH—) of a pyrrolidinyl group.

The self-crosslinking functional group in the component (ii-2) means a functional group which can cause a crosslinking reaction with the same functional group, and specifies the functional group in view of functions and properties. The self-crosslinking functional group includes, for example, a radical polymerization reactive functional group, a cation polymerization reactive functional group, and a functional group only capable of optical crosslinking. The radical polymerization reactive self-crosslinking functional group includes, for example, a functional group containing a radical polymerization reactive carbon-carbon double bond (C=C); the cation polymerization reactive self-crosslinking functional group includes, for example, a cation polymerization reactive C=C, an epoxy group, an oxetanyl group, and an crosslinking silicon compound such as an alkoxysilyl group or a silanol group; and the self-crosslinking functional group capable of crosslinking only by light includes, for example, a photodimerisable functional group of vinylcinnamic acid.

In the present invention, the self-crosslinking functional group is preferably a substituted or unsubstituted vinyl or epoxy group containing a radical polymerization reactive carbon-carbon double bond (C=C), and is particularly preferably a functional group represented by the following structural formula:

[Chemical Formula 3]

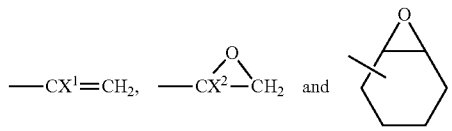

wherein $X^1$ is a hydrogen atom (—H), a methyl group (—CH$_3$) or a fluorine atom (—F), and $X^2$ is a hydrogen atom (—H) or a methyl group (—CH$_3$).

In the composition of the present invention, when the monomer as the component (ii-2) is a monomer having no self-crosslinking functional group, a curing agent is required for the progress of a curing (crosslinking) reaction. In this case, an unreacted curing agent having comparatively low molecular weight is likely to segregate on a surface of a coating film and thus a surface modification effect of the cured surface formed by curing the composition of the present invention with high energy rays may deteriorate. However, since the self-crosslinking functional group does not require a curing agent in the curing reaction, a surface modification effect can be sufficiently exerted.

In the present invention, one self-crosslinking functional group can cause a crosslinking reaction with another kind of a self-crosslinking functional group or a non-self-crosslinking functional group. Also a crosslinking reaction via a crosslinking agent (curing agent) is possible.

A perfluoropolyether-containing compound (I-i-ii) having at least one self-crosslinking functional group can be obtained, for example, by reacting, a triisocyanate (i) with at least two active hydrogen-containing compounds as the component (ii), that is, by reacting an isocyanate group (—NCO) in the triisocyanate (i) with an active hydrogen in the component (ii). With respect to an equivalent ratio of the NCO group in the triisocyanate (i) to the active hydrogen in the component (ii), at least one equivalent amount of active hydrogen is preferred per equivalent of NCO group, and a ratio of 1:1 is particularly preferred.

In the reaction of the NCO group in the triisocyanate (i) and the component (ii), the reaction may be performed by simultaneously adding components (ii-1) and (ii-2) to the triisocyanate (i), or the reaction may be performed by sequentially adding components (ii-1) and (ii-2) (the order of addition is not limited to the order described).

The reaction product of the triisocyanate (i) and the component (ii) preferably has no NCO group.

The sum total of the active hydrogen of the component (ii-1) and the active hydrogen of the component (ii-2) is preferably from 2.5 to 3.5 mol, and more preferably at least 3 mol, based on 1 mol of the triisocyanate (i).

With respect to the amount of the component (ii-1), the lower limit is preferably 0.0001 mol, specifically preferably 0.01 mol, and particularly preferably 0.1 mol, while the upper limit is preferably 2 mol, specifically preferably 1.5 mol, and particularly preferably 1.0 mol, based on 1 mol of the triisocyanate (i).

With respect to the amount of the component (ii-2), the lower limit is preferably 1 mol, specifically preferably 1.2 mol, and particularly preferably 1.5 mol, while the upper limit is preferably 2.5 mol, specifically preferably 2.0 mol, and particularly preferably 1.8 mol, based on 1 mol of the triisocyanate (i).

The component (ii) may further contain a compound (ii-3) having an active hydrogen other than the above compounds (ii-1) and (ii-2). When the component (ii) contains the component (ii-3), a compound (I-i-ii) can be obtained by reacting a component (i) with components (ii-1), (ii-2) and (ii-3). The reaction may be performed by simultaneously adding components (ii-1), (ii-2) and (ii-3) to the triisocyanate (i), or the reaction may be performed by sequentially adding components (ii-1), (ii-2) and (ii-3) (the order of addition is not limited to the order described).

It is preferred that an NCO group in the triisocyanate (i) (1 mol) is reacted with 1 mol or more of a component (ii-2) and reacting remaining NCO groups with a component (ii-1) and a component (ii-3). The sum total of active hydrogen in components (ii-1), (ii-2) and (ii-3) is preferably from 2.5 to 3.5 mol, more preferably at least 3 mol, and particularly preferably 3 mol, based on 1 mol of the triisocyanate (i).

The triisocyanate (i) is a triisocyanate obtained by trimerizing a diisocyanate.

Examples of the diisocyanate used to obtain the triisocyanate (i) include diisocyanates having aliphatically bonded isocyanate groups, such as hexamethylene diisocyanate, isophorone diisocyanate, xylylene diisocyanate, hydrogenated xylylene diisocyanate and dicyclohexylmethane diisocyanate; and diisocyanates having aromatically bonded isocyanate groups, such as tolylene diisocyanate, diphenylmethane diisocyanate, polymethylenepolyphenyl polyisocyanate, tolidine diisocyanate and naphthalene diisocyanate.

Specific examples of the triisocyanate (i) include,

[Chemical Formula 4]

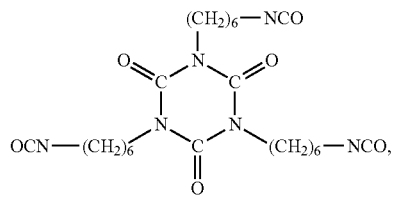

but are not limited thereto.

As described above, the component (ii) as a combination of at least two active hydrogen-containing compounds necessarily contains a combination of:

(ii-1) a perfluoropolyether having at least one active hydrogen, and (ii-2) a monomer having an active hydrogen and a self-crosslinking functional group and, if necessary, the component (ii) may further contain:

(ii-3) a compound having active hydrogen, other than the above components (ii-1) and (ii-2). Examples of the group having an active hydrogen include the same reactive groups having the same active hydrogen as those described above. Examples thereof include a hydroxyl group (—OH), an amino group (—NH$_2$), a mercapto group (—SH), an amide bond (—CONN—), an imino bond (—NH—) and a phosphorus-hydrogen bond (—PH—).

The perfluoropolyether (ii-1) is preferably a compound which has, in addition to a perfluoropolyether group, one hydroxyl group at one molecular end, or has each one hydroxyl group at both ends.

The perfluoropolyether (ii-1) preferably has at least one unit selected from an OCF$_2$ group, an OCF$_2$CF$_2$ group, an OCF$_2$CF$_2$CF$_2$ group and an OC(CF$_3$)FCF$_2$CF$_2$ group. A molecular weight of the perfluoropolyether (ii-1) is preferably from 200 to 500,000, and particularly preferably from 500 to 10,000,000.

The perfluoropolyether (ii-1) is particularly preferably a compound represented by the general formula:

[Chemical Formula 5]

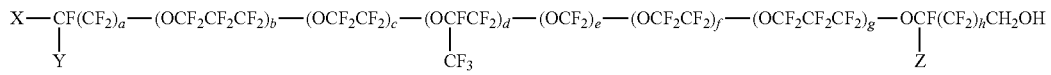

wherein X is F or a —CH$_2$OH group; Y and Z are the same or different and each is F or —CF$_3$; and a is an integer of 1 to 16, c is an integer of 0 to 5, b, d, e, f and g are the same or different and each is an integer of 0 to 200 and h is an integer of 0 to 16. In the general formula, it is not necessary that each unit is arranged in the order described, and each unit may be arranged in any order.

Specific examples of the compound include those described in International Publication WO03/002628 pamphlet (corresponding to U.S. Pat. No. 6,906,115 B2, the disclosure of which is incorporated by reference herein). Among these compounds, preferable are compounds in which a perfluoropolyether (PFPE) moiety has a number average molecular weight of 1,000 or more, and particularly preferably 1,500 or more and 10,000 or less, particularly 5,000 or less, more particularly 3,000 or less. When the molecular weight decreases, antifouling property and lubricity tend to deteriorate. In contrast, when the molecular weight increases, solubility in the solvent tends to deteriorate. Since proper degree of crosslinking is obtained even at the end portion, a compound modified with an alcohol at one end is preferred.

The monomer having an active hydrogen and a self-crosslinking functional group (ii-2) is preferably a (meth)acrylate ester or vinyl monomer (having, for example, 2 to 30 carbon atoms, particularly 3 to 20 carbon atoms) which has an active hydrogen, particularly a hydroxyl group.

Examples of the monomer (ii-2) include hydroxyethyl (meth)acrylate, hydroxypropyl(meth)acrylate, hydroxybutyl (meth)acrylate, aminoethyl(meth)acrylate, HO(CH$_2$CH$_2$O)$_i$—COC(R)C=CH$_2$ (R: H, CH$_3$; i=2 to 10), CH$_3$CH(OH)CH$_2$OCOC(R)C=CH$_2$ (R: H, CH$_3$; 2-hydroxypropyl (meth)acrylate), CH$_3$CH$_2$CH(OH)CH$_2$OCOC(R)C=CH$_2$ (R: H, CH$_3$; 2-hydroxybutyl(meth)acrylate), C$_6$H$_5$OCH$_2$CH(OH)CH$_2$OCOC(R)C=CH$_2$ (R: H, CH$_3$; 2-hydroxy-3-phenoxypropyl(meth)acrylate), allyl alcohol, HO(CH$_2$)$_k$CH=CH$_2$ (k=2 to 20), (CH$_3$)$_3$SiCH(OH)CH=CH$_2$ and styryl phenol. In view of excellent solubility of a reaction product in a solvent, 2-hydroxyethyl(meth)acrylate, 2-hydroxypropyl(meth)acrylate and 2-hydroxybutyl (meth)acrylate are preferred.

The compound (ii-3) having an active hydrogen as the optional component is preferably a compound which has neither a perfluoropolyether group nor a self-crosslinking functional group, and has at least one active hydrogen. Preferred examples of the compound (ii-3) are as follows:

(ii-3-1) a monohydric alcohol comprising a straight-chain or branched hydrocarbon having 1 to 16 carbon atoms;

[Chemical Formula 6]

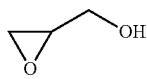

(ii-3-2)

(ii-3-3) a secondary amine comprising straight-chain or branched hydrocarbon having 1 to 16 carbon atoms;

(ii-3-4) a secondary amine (having, for example, 6 to 20 carbon atom) which has an aromatic group;

(ii-3-5) an Rf alcohol; Q(CF$_2$)$_l$(CH=CH)$_m$(CHI)$_n$(CH$_2$)$_o$OH (Q is a hydrogen atom, a fluorine atom or a (CF$_3$)$_2$CF— group, l is an integer of 1 to 10, m and n each is an integer of 0 to 1 and o is an integer of 1 to 10);

(ii-3-6) a polyalkylene glycol monoester; for example, R(OCH$_2$CH$_2$)$_p$OH, R(OCH$_2$CH$_2$CH$_2$)$_q$OH (R is straight-chain or branched hydrocarbon having 1 to 16 carbon atoms, an acetyl group or an alkylphenoxy group, and p and q each is an integer of 1 to 20), (ii-3-7) an aromatic alcohol;

(ii-3-8) a silane compound having an active hydrogen, for example (CH$_3$)$_3$Si(CH$_2$)$_s$OH (s is an integer of 1 to 20); and (ii-3-9)

[Chemical Formula 7]

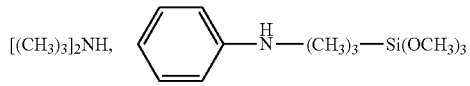

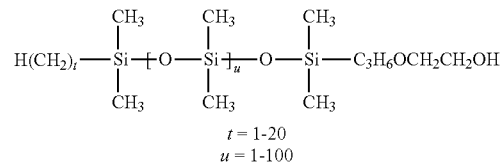

$t = 1-20$
$u = 1-100$

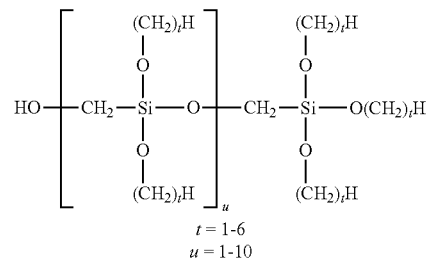

$t = 1-6$
$u = 1-10$

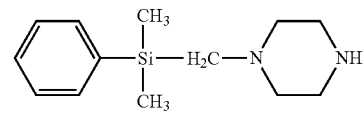

and the like.

A reaction of obtaining a perfluoropolyether-containing compound (I-i-ii) having a carbon-carbon double bond (C=C) as a self-crosslinking functional group can be shown in the following scheme. In the scheme, PFPE is a perfluoropolyether group.

[Chemical Formula 8]

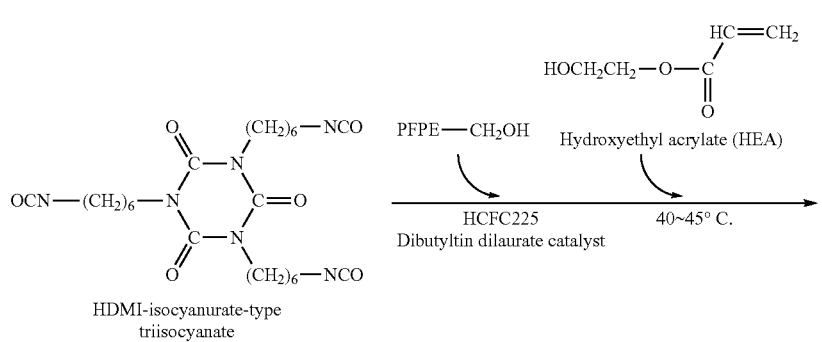

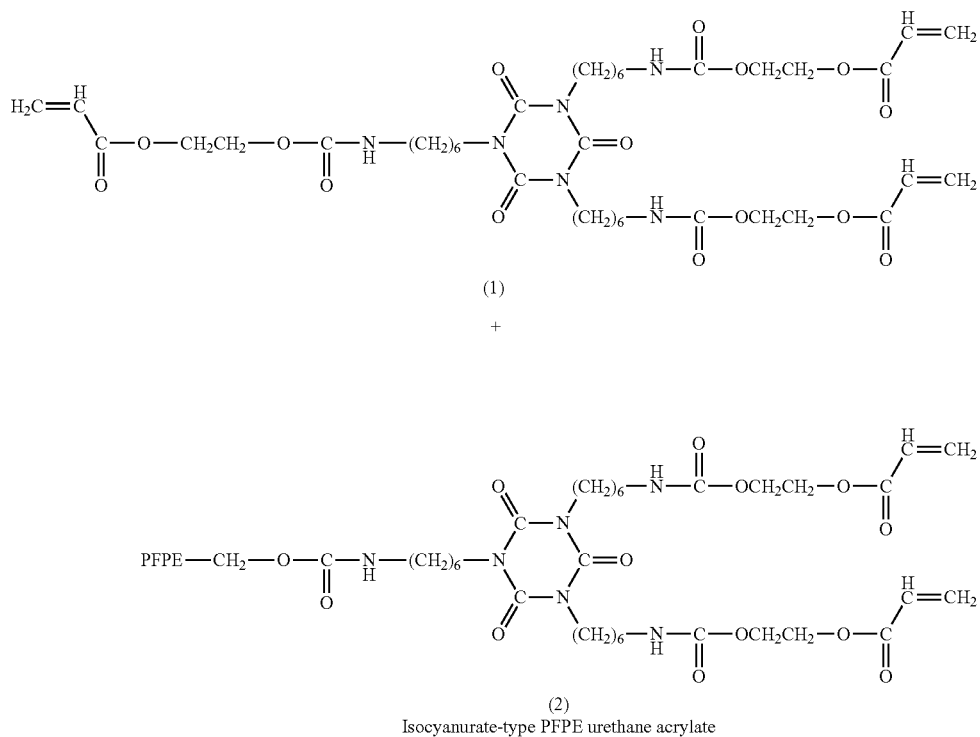

Isocyanurate-type PFPE urethane acrylate

Affinity to nonfluorine-based materials can be imparted to a compound (I-i-ii) by reacting the triisocyanate (i) such as a triisocyanate (for example, an HMDI-isocyanurate-modified trimer) which is a trimer of a diisocyanate (for example, alkyl diisocyanate) having high affinity with various nonfluorine-based materials with a perfluoropolyether (ii-1) having a terminal active hydrogen, and an addition-polymerizable monomer (ii-2) (containing a self-crosslinking functional group) having an active hydrogen.

When an active hydrogen of a component (ii-2), an active hydrogen of a component (ii-1) and an NCO group of a triisocyanate (i) (in an equivalent ratio of 2/1/3) are reacted in the same reactor, the above single compound (2) is obtained. The compound (2) has high compatibility with a diluent, particularly a fluorine-free diluent.

Furthermore, when a reaction charge ratio is adjusted and all the NCO groups of a triisocyanate are modified so as to satisfy the following relation [active hydrogen of component (ii-1)]/[active hydrogen of component (ii-2)]≤½ (equivalent ratio), a mixture of plural components, for example, a non-fluorine-based compound (1) represented by the above formula (1) and a fluorine-based compound (I-i-ii) having a PFPE group represented by the formula (2) can be produced in the same reactor in a one-pot manner. The resultant mixture is an addition-polymerizable composition having further enhanced emulsifiability. Since the nonfluorine-based compound (1) contains no fluorine and has a structure similar to that of the compound (I-i-ii) of the formula (2), the nonfluorine-based compound has both roles of solubilizing the fluorine-based compound (I-i-ii) in the solvent and serving as a polyfunctional acrylate crosslinking agent.

In the present invention, the compound (I-i-ii) is a compound represented by the above formula (2). The component (D) may be in the form of a mixture containing a compound represented by the formula (1) as a reaction by-product.

Specific examples of the perfluoropolyether-containing compound (I-i-ii) having a self-crosslinking functional group obtained by using the third component (that is, component (ii-3)) include a compound of the following chemical formula.

[Chemical Formula 9]

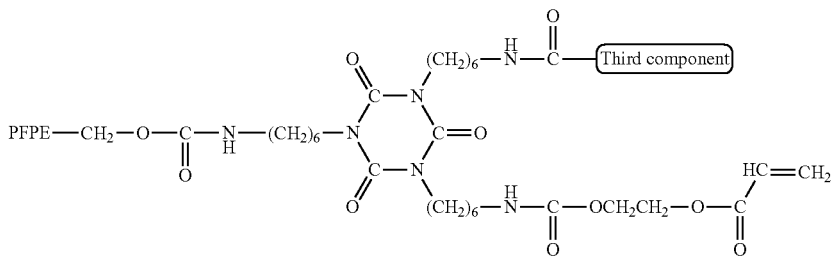

The compound (I-i-ii) may be a compound represented by the above chemical formula in which a first isocyanate group contained in an isocyanurate ring is reacted with a component (ii-1), a second isocyanate group is reacted with a component (ii-2) and a third isocyanate group is reacted with a component (ii-3). In the present invention, the component (D) may be in the form of a mixture containing the following compound having no PFPE group as a reaction by-product.

[Chemical Formula 10]

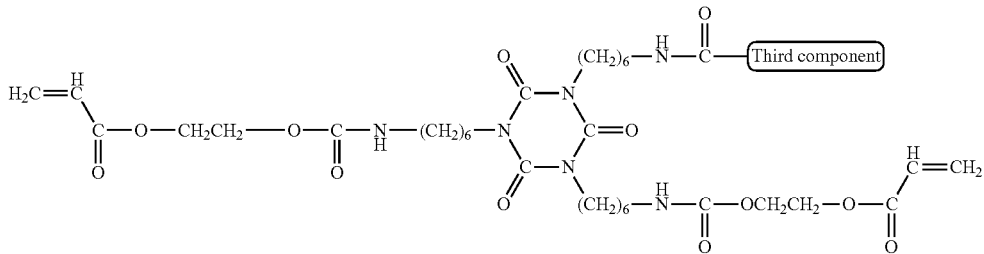

The reaction of obtaining a perfluoropolyether-containing compound (I-i-ii) having an epoxy group as a self-crosslinking functional group is similarly allowed to progress.

The compound (I-i-ii) is a compound containing one molecule of a perfluoropolyether compound (ii-2) bonded to at least one NCO group and one molecule of a self-crosslinking functional group-containing compound (ii-2) bonded to at least one NCO group. Remaining NCO groups are reacted with any one of components (ii-1), (ii-2) and (ii-3) to bond thereto.

The component (D) used in the present invention necessarily contains a compound (I-i-ii) and may be a mixture containing various compounds as a reaction by-product.

Examples of the reaction by-product include:
a compound in which a component (ii-1) is not bonded to an NCO group of a triisocyanate (i) (an NCO group is bonded to a component (ii-2) or a component (ii-3)),
a compound in which a component (ii-2) is not bonded to an NCO group of a triisocyanate (i) (an NCO group is bonded to a component (ii-1) or a component (ii-3)), and
a compound in which neither a component (ii-1) nor a component (ii-2) is bonded to an NCO group of a triisocyanate (i) (an NCO group is bonded to a component (ii-3)).

In the component (D), the proportion of the compound (I-i-ii) in which one molecule of component (ii-1) is bonded has a lower limit of preferably 0.01 mol %, more preferably 1 mol %, and particularly preferably 10 mol %, while the upper limit is preferably 100 mol %, more preferably 80 mol %, and particularly preferably 67 mol %. The compound (I-i-ii) in which two molecules of component (ii-1) are bonded may not necessarily exist, and when the compound (I-i-ii) exists, the lower limit of the proportion is preferably 0.01 mol %, and more preferably 1 mol %, while the upper limit is preferably 100 mol %, more preferably 80 mol %, and particularly preferably 50 mol %.

When the optional component (ii-3) is used, with respect to the proportion of the compound (I-i-ii) in which one molecule of component (ii-3) is bonded, the lower limit is preferably 0.01 mol %, and more preferably 1 mol %, while the upper limit is preferably 100 mol %, more preferably 80 mol %, and particularly preferably 50 mol %. The perfluoropolyether-containing compound comprising the bonded two molecules of component (ii-3), which is not contained in the compound (I-i-ii), may exist and the lower limit of the proportion thereof is preferably 0.01 mol %, and more preferably 1 mol %, while the upper limit is preferably 80 mol %, more preferably 50 mol %, and particularly preferably 30 mol %.

Furthermore, the composition of the present invention may contain, in addition to the components (A) to (D), a solvent as a component (E) (diluent), for example, an organic solvent, particularly an alcohol. The component (E) may be an alcohol alone, or a mixture of an alcohol and the other solvent. Two or more solvents, for example, an alcohol and other solvents may be used in combination. In the composition of the present invention, the amount of the component (E) is preferably within a range from 10 to 1,000 parts by weight, and more preferably from 10 to 500 parts by weight, based on 100 parts by weight of the component (A).

Specific examples of the component (E) include alcohols such as methanol, ethanol, isopropyl alcohol, butanol, isobutyl alcohol, ethylene glycol, diethylene glycol, triethylene glycol, ethylene glycol monomethyl ether, diethylene glycol monomethyl ether and triethylene glycol monomethyl ether. Examples of the organic solvent other than alcohols include ketones (having, for example, 2 to 20 carbon atoms) such as acetone, methyl ethyl ketone and methyl isobutyl ketone;

aromatic hydrocarbons (having, for example, 2 to 20 carbon atoms) such as toluene and xylene; aliphatic hydrocarbons (having, for example, 5 to 20 carbon atoms) such as hexane, octane and heptane; organic chlorine-based solvents (having, for example, 1 to 20 carbon atoms) such as chloroform, methylene chloride, trichloroethylene and carbon tetrachloride; and esters (having, for example, 1 to 20 carbon atoms) such as ethyl acetate, butyl acetate and isobutyl acetate. The content of the alcohol is preferably within a range from 10 to 90% by weight, and more preferably from 30 to 70% by weight, based on the total amount of the entire solvents.

Furthermore, the composition of the present invention may contain water as a component (F). Such a component (F) is an optional component which is used for hydrolysis of the component (B) and the amount is preferably within a range from 1 to 50 parts by weight, and more preferably from 5 to 30 parts by weight, based on 100 parts by weight of the component (B). The component (B) is usually reacted with a silanol group on a surface of colloidal silica as the component (C) and is further hydrolyzed with the component (F). Therefore, the amount of the component (F) may be less than the amount which enables complete hydrolysis of the component (B).

Furthermore, the composition of the present invention may contain a photopolymerization initiator as a component (G). The component (G) is preferably blended when the composition of the present invention is cured by irradiation with ultraviolet rays. The photopolymerization initiator used for curing with ultraviolet rays is not particularly limited, and can be selected from conventionally known compounds capable of generating a radical under irradiation with ultraviolet rays, for example, organic peroxides, carbonyl compounds, organic sulfur compounds and azo compounds.

Specific examples thereof include acetophenone, propiophenone, benzophenone, xanthol, fluoreine, benzaldehyde, anthraquinone, triphenylamine, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy ketal, 2-chlorothioxanthone, diethylacetophenone, 1-hydroxycyclohexyl phenyl ketone, 2-methyl[4-(methylthio)phenyl]2-morpholino-1-propanone, 2,2-dimethoxy-2-phenylacetophenone and diethoxyacetophenone. These photopolymerization initiators may be used alone, or two or more of them may be used in combination.

In the composition of the present invention, the component (G) is preferably 2-methyl-1-[4-(methylthio)phenyl]-2-morpholinopropanon-1-one [manufactured by Nihon Ciba-Geigy K.K. under the trade name of IRGACURE 907] or 1-hydroxy-cyclohexyl-phenyl-ketone [manufactured by Nihon Ciba-Geigy K.K. under the trade name of IRGACURE 184]. The amount of the component (G) is not particularly limited, and is preferably within a range from 1 to 30 parts by weight, and more preferably from 1 to 20 parts by weight, based on 100 parts by weight of the component (A).

As long as the object of the present invention is not adversely affected, components other than the above components may be added to the composition of the present invention. Examples thereof include tetraalkoxysilanes such as tetramethoxysilane, tetraethoxysilane and tetraisopropoxysilane; and alkylalkoxysilanes such as methyltrimethoxysilane, methyltriethoxysilane, methyltriisopropoxysilane, ethyltrimethoxysilane, ethyltriethoxysilane and ethyltriisopropoxysilane.

As long as the object of the present invention is not adversely affected, antioxidants; thickeners; surfactants such as leveling agents, defoamers, sedimentation inhibitors, dispersing agents, antistatic agents and antifog additives; ultraviolet absorbers; colorants such as various pigments and dyes; fillers such as aluminum paste, talc, glass frit and metal powder; and self-polymerization inhibitors, for example, acrylates such as butylated hydroxytoluene (BHT) and phenothiazine (PTZ) can be optionally added to the composition of the present invention.

The method for producing a composition of the present invention is optional and the composition can be prepared by mixing the above components (A) to (G) and other optional components. The method is preferably a method comprising preparing the component (D) by the above method, reacting the component (B) and the component (C) in the component (E) while mixing at a temperature within a range from room temperature to a reflux temperature of a solvent, for example, a temperature of about 20 to 70° C., for 1 minute to 20 hours, and adding other components. At this time, the component (A), the component (D), and the component (G) may be contained. The component (G) may be added and mixed after cooling. After preparing a mixture by reacting components other than the component (D) while mixing at a temperature within a range from room temperature to a reflux temperature of a solvent, for example, a temperature of about 20 to 70° C., for 1 minute to 20 hours and cooling, the component (D) may be blended.

Since the composition of the present invention has excellent compatibility between components and therefore has a uniform appearance, a uniform coating film having excellent appearance can be formed on various substrates. The composition of the present invention has an advantage that it can be coated in a desired thickness when coated using a known coating method without causing sagging and separation of various components after coating.

The composition of the present invention is cured within a very short time after coating on various substrates, drying and irradiation with high energy rays. Examples of the high energy rays include ultraviolet rays, electron beam and γ rays. When ultraviolet rays are used, a cured thin film layer is formed within a very short time. The dose of ultraviolet rays is at least 2 mJ/cm$^2$, and preferably from 10 to 2,000 mJ/cm$^2$. When electron beam or γ rays are used as the high energy rays, it is not necessary to blend the component (G). The composition of the present invention is dried at normal temperature and can be heated when dried more quickly.

The substrate, on which the composition of the present invention is coated, is not particularly limited. Examples of the material of the substrate include various plastics, for example, polyolefin-based resins such as polyethylene and polypropylene; polyester-based resins such as polyethylene terephthalate, polyethylene isophthalate, polyethylene-2,6-naphthalate and polybutylene terephthalate, and copolymers thereof; polyamide-based resins such as polyoxymethylene; thermoplastic resins such as polystyrene, poly(meth)acrylate ester, polyacrylonitrile, vinyl polyacetate, polycarbonate, cellophane, polyimide, polyetherimide, polyphenylenesulfone, polysulfone, polyetherketone, ionomer resin and fluororesin; and thermosetting resins such as melamine resin, polyurethane resin, epoxy resin, phenol resin, unsaturated polyester resin, alkyd resin, urea resin and silicone resin; glass; ceramics; metals such as aluminum, zinc, iron, nickel, cobalt, copper, tin, titanium, gold, silver, platinum, and alloys thereof; concrete; woods; fiber cloths; fibers; nonwoven fabrics; leathers; papers; and stones (including marble). Since the composition of the present invention is cured to form a cured coating film which enables formation of a cured coating film which has excellent hardness, prevents adhesion of oil and fat stains, allows oil and fat stains to be wiped off, and has scratch resistance, transparency, water repellency, adhesion, smoothness and uniformity, the composition is preferably coated on a surface of substrates requiring excellent appearance and strength and cured by irradiation with the above-mentioned high energy rays. The material of the substrate, on which the composition of the present invention is coated, is particularly preferably plastic, glass, ceramic or metal. Examples of the shape of the substrate include, but are not limited to, film, sheet, bottle and solid. Among these, a thermoplastic plastic film is preferred. The thickness of the substrate is not particularly limited and is usually within a range from 5 to 100 μm in the case of film and sheet.

The method of coating the composition of the present invention is not particularly limited and, for example, a thin film layer of the composition of the present invention can be formed on a surface of various substrates by a known method such as a flow coating, dip coating, rotary coating, spray coating, curtain coating, gravure coating, mayer bar coating or dip coating method. Before coating, the surface of the substrate may be preliminarily subjected to a surface activation treatment such as a corona treatment, or a known anchor treatment with a urethane resin. When scratch resistance is required, the amount of the composition of the present invention is preferably adjusted so as to control the thickness of the layer within a range from 0.5 to 25 μm, and more preferably from 1 to 20 μm. After coating, the resultant thin film is dried and then cured.

EXAMPLES

The present invention will be described in more detail below by way of Examples and Comparative Examples, but the present invention is not limited to the following Examples. In the following Examples, parts are by weight and Me denotes a methyl group. The viscosity was measured at 25° C. Characteristics of Examples and Comparative Examples were determined by the following procedures. Structures of compounds were identified using $^{19}$F-NMR and $^{1}$H-NMR.

[Viscosity]

Viscosity was measured at 25° C. using an E-type viscometer (DIGITAL VISCOMETER manufactured by TOKI-OMEC).

[Appearance]

A surface state of a cured coating film was visually observed and then evaluated according to the following criteria.

Good: uniform and transparent
Poor: unevenness measuring about 0.5 to 5 mm is observed

[Water Contact Angle]

One droplet of water was dropped on a cured coating film. One minute after dropping, a contact angle at 25° C. of water was measured using a contact angle measuring system (CA-Z, manufactured by Kyowa Interface Science Co., Ltd.).

[Hexadecane Contact Angle]

One droplet of hexadecane was dropped on a cured coating film. One minute after dropping, a contact angle at 25° C. of hexadecane was measured using a contact angle measuring system (CA-Z, manufactured by Kyowa Interface Science Co., Ltd.).

[Total Light Transmittance and Haze]

Total light transmittance and haze at room temperature of a cured coating film were measured using a turbid/chromaticity measuring equipment [Water Analyzer 2000N, manufactured by Nippon Denshoku Industries Co., Ltd.]. Using an untreated PET film as a blank, zero adjustment was performed.

[Pencil Hardness]

Pencil hardness of a cured coating film was measured in accordance with the method described in JIS K5600. Pencil hardness, at which the cured thin film is scratched by a pencil with 1 kg of a load applied, was taken as a minimum value.

[Adhesion]

Adhesion of a cured coating film was measured in accordance with the method described in JIS K5600. 10 vertical cut lines and 10 horizontal cut lines were formed on the cured coating film at an interval of about 1 mm respectively, followed by adhering an adhesive cellophane tape thereonto, and separating the tape to evaluate the coating film.

[Coefficient of Static Friction]

A coefficient of static friction of a surface of a thin film layer of a cured coating film was measured using a portable friction meter [TRIBOGEAR•Muse Type 94I, manufactured by Shinto Scientific Co., Ltd.].

[Scratch Resistance]

Scratch resistance was evaluated by a difference in haze (ΔH) of a cured coating film before and after a Taber type abrasion test. The Taber type abrasion test was performed under the conditions of a load: 1 kg and 100 rpm using a wear ring of CS-10F.

[Marking-Pen-Ink Repellency/Removability]

Marking-pen-ink repellency of a cured coating film was evaluated by the following procedure. Using a marking pen [Oily Macky Black, manufactured by ZEBRA CO. LTD.], a drawing operation was performed at room temperature on a cured coating film. Then, appearance was observed and marking-pen-ink repellency was evaluated according to the following criteria:

Good: no repellency
Poor: repellency occurred

Furthermore, the drawn cured coating film was allowed to stand at room temperature for 5 minutes and marking-pen-ink was wiped off using KIMWIPES S-200 (manufactured by NIPPON PAPER CRECIA Co., LTD.). Then, marking-pen-ink removability of the cured coating film was evaluated according to the following criteria:

Good: removable
Poor: darkening occurred or impossible to remove

[Water Contact Angle, Marker-Pen-Ink Repellency/Removability after Ethanol Rubbing]

After rubbing a surface of a cured coating film with reciprocating 50 times using KIMWIPES S-200 (manufactured by NIPPON PAPER CRECIA Co., LTD.) immersed with ethanol at room temperature, water contact angle and marker-pen-ink repellency/removability of the cured coating film were measured in the same manner as described above.

Reference Example 1

Preparation of "PGM Solution A of Acrylate Composition"

In a flask, 30.6 g of propylene glycol monomethyl ether (hereinafter abbreviated to PGM) and 21.4 g of a mixture of dipentaerythritol hexaacrylate (60 wt %) and dipentaerythritol (monohydroxy)pentaacrylate (40 wt %) were charged and then stirred. 4.02 g of 3-methacryloxytrimethoxysilane, 40.2 g of a PGM dispersion (concentration: 30 wt %, average particle diameter of colloidal silica: 13 nm) of colloidal silica and 0.4 g of water were added in this order, followed by stirring, heating to 50° C. and further stirring for one hour. After cooling, 2.01 g of a photopolymerization initiator [manufactured by Nihon Ciba-Geigy K.K. under the trade name of IRGACURE 184] and 4.0 mg of phenothiazine were added to prepare a "PGM solution A of an acrylate composition". The resultant "PGM solution A of an acrylate composition" had a viscosity of 6 mPa·s.

Reference Example 2

Preparation of "20 wt % Fluorine Alcohol Solution B of Perfluoropolyetherurethane Acrylate Composition"

In a 1 L four-necked glass flask equipped with a dropping funnel, a stirrer, a thermometer, a condenser and a nitrogen injection inlet, 39 g of SUMIDUR N3300 (cyclic trimer of hexamethylene diisocyanate, manufactured by SUMIKA BAYER URETHANE CO., LTD., NCO group content: 21.9%), 215 g of 1,1,2,2,3,3,4-heptafluorocyclopentane and 0.04 g of a dibutyltin dilaurate solution were added and the temperature was adjusted to 40° C. while stirring. While maintaining a temperature in the flask at 40° C. under stirring, a solution prepared by preliminarily mixing 50 g of DEMNUM ($CF_3CF_2O$—$(CF_2CF_2CF_2O)_{10.9}CF_2CF_2CH_2OH$, a polyfluoropolyether monoalcohol having a purity of 89.0% identified by $^{19}F$-NMR and $^1H$-NMR, manufactured by Daikin Industries, Ltd.) and 50 g of 1,1,2,2,3,3,4-heptafluorocyclopentane was added over 4 hours. The entire components were added dropwise and, after stirring for one hour, a sample was collected and the infrared spectrophotometry (IR) revealed that absorption of —OH (a terminal group of DEMNUM) completely disappeared. While maintaining a temperature in the flask at 40° C. under stirring, 26 g of hydroxyethyl acrylate was added dropwise over 20 minutes, followed by stirring for 4 hours. IR revealed that an absorption of NCO (derived from SUMIDUR N3300) completely disappeared to obtain a 30 wt % heptafluorocyclopentane solution of a perfluoropolyetherurethane acrylate composition.

To the 30 wt % 1,1,2,2,3,3,4-heptafluorocyclopentane solution of a perfluoropolyetherurethane acrylate composition, 0.06 g of butylhydroxytoluene was added, followed by dissolution while stirring. The resultant solution was warmed to 50° C. and 1,1,2,2,3,3,4-heptafluorocyclopentane was distilled off under reduced pressure (under about 100 mmHg for about 1.5 hours). 460 g of 2,2,3,3-tetrafluoropropanol was added and then distilled off under reduced pressure (under about 70 mmHg for about 2 hours) to obtain a 20 wt % 2,2,3,3-tetrafluoropropanol solution of a perfluoropolyetheracrylate composition ("20 wt % fluorine alcohol solution B of a perfluoropolyetherurethane acrylate composition").

Reference Example 3

Preparation of "PGM/MEK Solution C of Acrylate Composition"

In a flask, 17.0 g of methyl ethyl ketone (hereinafter abbreviated to MEK) and 21.3 g of a urethaneacrylate-based resin [manufactured by Nippon Kayaku Co., Ltd. under the trade name of UX-5000] were charged, followed by stirring. 5.30 g of 3-methacryloxytrimethoxy-silane, 53.3 g of a PGM dispersion (concentration: 30 wt %, an average particle diameter of colloidal silica: 13 nm) of colloidal silica and 0.53 g of water were added in this order, followed by stirring, heating to 50° C. and further stirring for one hour. After cooling, 2.17 g of a photopolymerization initiator [manufactured by Nihon Ciba-Geigy K.K. under the trade name of IRGACURE 184] and 4.4 mg of phenothiazine were added to prepare a "PGM/MEK solution C of an acrylate composition". The resultant "PGM/MEK solution C of an acrylate composition" had a viscosity of 6 mPa·s.

Example 1

100 g of the "PGM solution A of an acrylate composition" and 4 g of the "20 wt % fluorine alcohol solution B of a perfluoropolyetherurethane acrylate composition" obtained by the above method were mixed to obtain a high energy ray-curable composition 1. The high energy ray-curable composition 1 was coated on a 188 μm thick PET film using a spin coater and then dried at 120° C. for 2 minutes. The high energy ray-curable composition was cured by irradiating with ultraviolet rays at a dose of 2,000 mJ/cm$^2$ using UNI-CURE SYSTEM (lamp: high-pressure mercury lamp UVL-4000-O/N) manufactured by USHIO to obtain a 3 μm thick PET film having a cured coating film (thin film layer) made of the high energy ray-curable composition 1. Characteristics of the cured coating film were determined. The results are shown in Table 1.

As shown in Table 1, a cured coating film made of the high energy ray-curable composition 1 was a transparent film having uniform appearance. The film had a high water contact angle and was excellent in water repellency. The film also had a high hexadecane contact angle and high oil repellency. The film was excellent in adhesion and was a smooth film having a low coefficient of static friction. The film showed a small value of ΔH and was excellent in scratch resistance. It was impossible to perform a drawing operation because of repellence of marking-pen-ink, and the marking-pen-ink could be removed when rubbed with KIMWIPES. A difference in water contact angle and marking-pen-ink repellency/removability was scarcely observed before and after an ethanol rubbing test, and blur of a perfluoropolyether-containing urethaneacrylate composition was not observed.

Example 2

In a flask, 30.6 g of propylene glycol monomethyl ether (hereinafter abbreviated to PGM) and 21.4 g of a mixture of dipentaerythritol hexaacrylate (60 wt %) and dipentaerythritol (monohydroxy)pentaacrylate (40 wt %) were charged, followed by stirring. 4.02 g of 3-methacryloxytrimethoxysilane, 40.2 g of a PGM dispersion (concentration: 30 wt %, average particle diameter of colloidal silica: 13 nm) of colloidal silica, 2.0 g of a "20 wt % fluorine alcohol solution B of a perfluoropolyetherurethane acrylate composition" and 0.4 g of water were added in this order, followed by stirring, heating to 50° C. and further stirring for one hour. After cooling, 2.01 g of a photopolymerization initiator [manufactured by Nihon Ciba-Geigy K.K. under the trade name of IRGACURE 184] and 4.0 mg of phenothiazine were added to prepare a high energy ray-curable composition 2. The high energy ray-curable composition 2 had a viscosity of 6 mPa·s. In the same manner as in Example 1, the high energy ray-curable composition 2 was coated on a PET film and then cured by irradiating with ultraviolet rays. Characteristics of the resultant cured coating film were determined. The results are shown in Table 1.

Example 3

100 g of the "PGM/MEK solution C of an acrylate composition" and 2 g of the "20 wt % fluorine alcohol solution B of perfluoropolyetherurethane acrylate composition" obtained by the above method were mixed to obtain a high energy ray-curable composition 3. The high energy ray-curable composition 3 was coated on a 188 μm thick PET film using a spin coater and then dried at 120° C. for 2 minutes. Furthermore, the high energy ray-curable composition was cured by irradiating with ultraviolet rays at a dose of 2,000 mJ/cm² using UNI-CURE SYSTEM (lamp: high-pressure mercury lamp UVL-4000-O/N) manufactured by USHIO to obtain a 3 μm thick PET film having a cured coating film (thin film layer) made of the high energy ray-curable composition 3. Characteristics of the cured coating film were determined. The results are shown in Table 1.

Comparative Example 1

In the same manner as in Example 1, 100 g of the "PGM solution A of an acrylate composition" obtained by the above method was used as the high energy ray-curable composition 3 was coated on a PET film and then cured by irradiating with ultraviolet rays. Characteristics of the cured coating film were determined. The results are shown in Table 1. The cured coating film had a low water contact angle and a low hexadecane contact angle and was inferior in marking-pen-ink repellency/removability when compared with the cured coating films of Examples.

Comparative Example 2

In a flask, 60.0 g of PGM, 37.8 g of a mixture of dipentaerythritol hexaacrylate (60 wt %) and dipentaerythritol (monohydroxy)pentaacrylate (40 wt %), 2.17 g of a photopolymerization initiator (manufactured by Nihon Ciba-Geigy K.K. under the trade name of IRGACURE 184), 4.4 mg of phenothiazine and 2.0 g of a "20 wt % fluorine alcohol solution B of a perfluoropolyetherurethane acrylate composition" were charged, followed by stirring to prepare a high energy ray-curable composition 4. The high energy ray-curable composition 4 had a viscosity of 6 mPa·s. In the same manner as in Example 1, the high energy ray-curable composition 4 was coated on a PET film and then cured by irradiating with ultraviolet rays. Characteristics of the cured coating film were determined. The results are shown in Table 1. The cured coating film showed a large difference in haze (ΔH) before and after a Taber type abrasion test and was inferior in scratch resistance when compared with the cured coating films of Examples.

Comparative Example 3

In a flask, 35.8 g of PGM, 35.7 g of a mixture of a urethane polymer (70 wt %) of pentaerythritol triacrylatehexamethylene diisocyanate and pentaerythritol tetraacrylate (30 wt %) (UA-306H, manufactured by KYOEISHA CHEMICAL Co., LTD.), 5.9 g of a mixture of pentaerythritol triacrylate (60 wt %), pentaerythritol diacrylate (35 wt %) and pentaerythritol tetraacrylate (5 wt %) (LIGHT ACRYLATE PE-3A, manufactured by KYOEISHA CHEMICAL Co., LTD.), 17.8 g of triethylene glycol diacrylate (LIGHT ACRYLATE 3EG-A, manufactured by KYOEISHA CHEMICAL Co., LTD.), 3.0 g of a "20 wt % fluorine alcohol solution B of a perfluoropolyetherurethane acrylate composition" and 1.8 g of a photopolymerization initiator [manufactured by Nihon Ciba-Geigy K.K. under the trade name of IRGACURE 907] were charged to prepare a high energy ray-curable composition 5. In the same manner as in Example 1, the high energy ray-curable composition 5 was coated on a PET film and then cured by irradiating with ultraviolet rays. Characteristics of the cured coating film were determined. The results are shown in Table 1. The cured coating film showed a large difference in haze (ΔH) before and after a Taber type abrasion test and was inferior in scratch resistance when compared with the cured coating films of Examples.

Comparative Example 4

In a flask, 48.9 g of PGM and 15.8 g of a mixture of dipentaerythritol hexaacrylate (60 wt %) and dipentaerythritol (monohydroxy)pentaacrylate (40 wt %) were charged, followed by stirring. 0.96 g of an amino-modified dimethylpolysiloxane fluid represented by an average molecular formula: $NH_2C_3H_6-Me_2SiO(Me_2SiO)_9SiMe_2-C_3H_6NH_2$ was added, followed by heating to 50° C. and further stirring for one hour to obtain a reaction mixture. To the reaction mixture, 2.87 g of 3-methacryloxytrimethoxysilane, 29.7 g of a PGM dispersion (concentration: 30 wt %, average particle diameter of colloidal silica: 13 nm) of colloidal silica and 0.29 g of water were added in this order, followed by stirring, heating to 50° C. and further stirring for one hour. After cooling, 1.43 g of a photopolymerization initiator [manufactured by Nihon Ciba-Geigy K.K. under the trade name of IRGACURE 184] and 3 mg of phenothiazine were added to prepare a high energy ray-curable composition 6. The high energy ray-curable composition 6 had a viscosity of 6 mPa·s. In the same manner as in Example 1, the high energy ray-curable composition 6 was coated on a PET film and then cured by irradiating with ultraviolet rays. Characteristics of the cured coating film were determined. The results are shown in Table 1. The cured coating film showed a low hexadecane contact angle and was inferior in oil repellency and properties of preventing adhesion of finger prints when compared with the cured coating films of Examples.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Appearance | Good | Good | Good | Poor | Good | Good | Good |
| Total light transmittance (%) | 101 | 101 | 101 | 102 | 101 | 101 | 103 |
| Haze (%) | 0 | 0 | 0 | 0 | 0 | 0 | 0 |
| Water contact angle (°) | 109 | 108 | 105 | 68 | 108 | 112 | 104 |
| Water contact angle after ethanol rubbing (°) | 106 | 106 | 102 | 65 | 106 | 107 | 102 |
| Hexadecane contact angle (°) | 68 | 63 | 62 | 17 | 63 | 67 | 25 |

TABLE 1-continued

| | Example 1 | Example 2 | Example 3 | Comparative Example 1 | Comparative Example 2 | Comparative Example 3 | Comparative Example 4 |
|---|---|---|---|---|---|---|---|
| Coefficient of static friction | 0.2 | 0.2 | 0.2 | 0.7 | 0.2 | 0.2 | 0.2 |
| Adhesion | 100/100 | 100/100 | 100/100 | 100/100 | 100/100 | 100/100 | 100/100 |
| Pencil hardness | 4H | 4H | 4H | 4H | 3H | 3H | 4H |
| ΔH | 6.3 | 5.8 | 6.0 | 4.8 | 13 | 19 | 6.5 |
| Marker-pen-ink repellency/removability | Good/Good | Good/Good | Good/Good | Poor/Poor | Good/Good | Good/Good | Good/Good |
| Marker-pen-ink repellency/removability after ethanol rubbing | Good/Good | Good/Good | Good/Good | Poor/Poor | Good/Good | Good/Good | Good/Good |

INDUSTRIAL APPLICABILITY

The above-described high energy ray-curable composition of the present invention is useful as a coating agent and a film-forming agent of various substrates. A cured coating film formed by curing the composition of the present invention can be used in various applications and is particularly suited for use in protective films for automotive and building windowpanes; protective films for displays, touch panels and magnetic cards; and transparent resin glass for automotive head lamps.

Furthermore, the composition of the present invention enables formation of a cured coating film on substrates having low hardness and excellent flexibility, such as a natural rubber and a synthetic rubber by coating on these flexible substrates. Examples of the synthetic rubber include SBR, NBR, EPM, EPDM, a nitrile rubber, a urethane rubber, a norbornene rubber, an acryl rubber, a chloroprene rubber, an epichlorohydrin rubber, a silicone rubber and a fluororubber. A flexible substrate of a silicone rubber is particularly preferred so as to form a surface protective layer of the cured composition on a surface of a keypad or a roll. These substrates may be in any form, for example, sheets, films, rolls, tubes and various moldings. Furthermore, a substrate containing various fillers incorporated therein can be used. By coating on substrates having a belt or roll shape or substrates having various keypad shapes among these substrates, functions such as properties of preventing adhesion of oil and fat stains, properties of wiping off oil and fat stains, scratch resistance and abrasion resistance can be imparted to a surface of the substrates without deteriorating conformity to the substrates and durability. These flexible substrates having a cured coating film are useful as key tops of keypads for cellular phones and various wireless remote controllers; and components for OA equipments (e.g. copying machines, printers) such as charging rolls, transfer rolls, transfer belts, intermediate transfer belts, developing rolls, fixing rolls and cleaning blades.

The invention claimed is:

1. A high energy ray-curable storage stable composition comprising the following components (A) to (D) and (G):
   (A) 100 parts by weight of a polyfunctional acrylate, wherein said polyfunctional acrylate comprises a combination of two or more polyfunctional acrylates selected from pentafunctional or higher polyfunctional acrylates,
   (B) 1 to 30 parts by weight of an organoalkoxysilane having an aliphatic unsaturated bond,
   (C) 1 to 100 parts by weight of colloidal silica, and
   (D) 0.2 to 20 parts by weight of a fluorine compound having an aliphatic unsaturated bond; wherein the fluorine compound is a reactive group-containing composition comprising a reaction product of (i) a triisocyanate formed by trimerizing a diisocyanate and (ii) at least two active hydrogen-containing compounds, and
   the component (ii) comprises:
   (ii-1) a perfluoropolyether having at least one active hydrogen, and
   (ii-2) a monomer having an active hydrogen and a self-crosslinking functional group; and
   (G) a photopolymerization initiator selected from the group consisting of organic peroxides, carbonyl compounds, organic sulfur compounds and azo compounds; wherein when said components (A) to (D) and (G) are combined, the composition exhibits storage stability, and when the composition is exposed to said high energy ray, a composition having oil, fat and scratch resistance is formed.

2. The high energy ray-curable composition according to claim 1, wherein the fluorine compound has a perfluoropolyether structure.

3. The high energy ray-curable composition according to claim 1, wherein the fluorine compound has a partial structure represented by the following general formula (a):

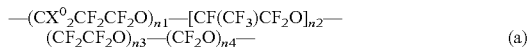

$$-(CX^0{}_2CF_2CF_2O)_{n1}-[CF(CF_3)CF_2O]_{n2}-(CF_2CF_2O)_{n3}-(CF_2O)_{n4}- \quad (a)$$

wherein n1, n2, n3 and n4 are the same or different and each is an integer of 0 or 1 or more, and n1+n2+n3+n4 is an integer of 7 to 40; and respective $X^0$ are the same or different and each is H, F or Cl.

4. The high energy ray-curable composition according to claim 1, wherein the self-crosslinking functional group of the monomer (ii-2) is at least one selected from the group consisting of:

[Chemical Formula 1]

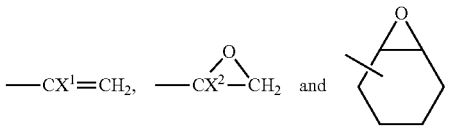

$X^1$ is H, $CH_3$ or F; and $X^2$ is H or $CH_3$.

5. The high energy ray-curable composition according to claim 1, wherein the perfluoropolyether (ii-1) is a compound which has one hydroxyl group at one molecular end, or has one hydroxyl group at each of both ends.

6. The high energy ray-curable composition according to claim 1, wherein the perfluoropolyether (ii-1) contains a compound represented by the general formula:

[Chemical Formula 2]

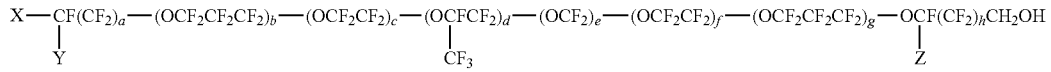

wherein X is F or a —$CH_2OH$ group; Y and Z are the same or different and each is F or —$CF_3$; a is an integer of 1 to 16, c is an integer of 0 to 5, b, d, e, f and g are the same or different and each is an integer of 0 to 200, and h is an integer of 0 to 16.

7. The high energy ray-curable composition according to claim 1, wherein the fluorine compound is a reaction product obtained by reacting an isocyanato group (—NCO group) of the triisocyanate component (i) with the component (ii-1) and then reacting with the component (ii-2).

8. The high energy ray-curable composition according to claim 1, wherein the fluorine compound is a reaction product obtained by reacting 1 mol of the triisocyanate component (i) with a sum total of the active hydrogen of the component (ii-1) and the component (ii-2) of from 2.5 to 3.5 mol in which a molar ratio of the active hydrogen of the component (ii-1) to the active hydrogen of the component (ii-2) is ½ or less.

9. The high energy ray-curable composition according to claim 1, which further contains 10 to 1000 parts by weight of (E) a solvent.

10. The high energy ray-curable composition according to claim 1, which further contains (F) water.

11. A coating agent comprising the high energy ray-curable composition according to claim 1.

12. A substrate selected from the group consisting of plastic, glass, ceramics, metal, concrete, wood, fiber cloth, fiber, nonwoven fabric, leather, paper and stone, comprising the high energy ray-curable composition according to claim 1 on a surface thereof.

13. A high energy ray-curable composition according to claim 1, where the photopolymerization initiator is selected from the group consisting of acetophenone, propiophenone, benzophenone, xanthol, fluoreine, benzaldehyde, anthraquinone, triphenylamine, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy ketal, 2-chlorothioxanthone, diethylacetophenone, 1-hydroxycyclohexyl phenyl ketone, 2-methyl[4-(methylthio)phenyl]2-morpholino-1-propanone, 2,2-dimethoxy-2-phenylacetophenone and diethoxyacetophenone.

14. The high energy ray-curable composition according to claim 1, wherein the polyfunctional acrylate is a pentafunctional to decafunctional acrylate.

\* \* \* \* \*